United States Patent [19]

Shim et al.

[11] 3,959,415
[45] May 25, 1976

[54] METHODS OF PREPARING STABLE CONDENSATION PRODUCTS AND PRODUCTS THEREFROM USING AN ALKYLENE OXIDE TREATMENT

[75] Inventors: Kyung S. Shim, Irvington; Edward N. Walsh, New City, both of N.Y.

[73] Assignee: Stauffer Chemical Company, Westport, Conn.

[22] Filed: May 28, 1974

[21] Appl. No.: 473,469

[52] U.S. Cl. .......................... 260/928; 260/2.5 AJ; 260/2.5 AR; 260/978; 260/983
[51] Int. Cl.² .............................................. C07F 9/08
[58] Field of Search ..................... 260/928, 978, 983

[56] References Cited
UNITED STATES PATENTS

| | | | |
|---|---|---|---|
| 3,641,202 | 2/1972 | Biranowski et al. | 260/928 X |
| 3,822,327 | 7/1974 | Weil | 260/928 |

*Primary Examiner*—Richard L. Raymond
*Attorney, Agent, or Firm*—Richard P. Fennelly

[57] ABSTRACT

Products which are phosphorus containing oligomers having

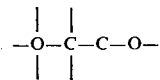

linkages between phosphorus atoms and which are obtained by the self-condensation of β-haloalkyl esters of pentavalent phosphorus acids or by condensation of these esters with an alkyl ester of a pentavalent phosphorus acid are treated after residual acidity has been neutralized with an alkylene oxide for a period of time which is sufficient to enable the alkylene oxide to act upon labile groups contained in the condensed product, i.e., cyclic, pyro and bridged groups, and to neutralize any further acidity generated by the opening of such groups. The stabilized products formed by this process when incorporated in a polyurethane foam formulation produce a foam having superior green strength to a foam containing such products which have not been treated in accordance with this invention.

7 Claims, No Drawings

METHODS OF PREPARING STABLE CONDENSATION PRODUCTS AND PRODUCTS THEREFROM USING AN ALKYLENE OXIDE TREATMENT

TECHNICAL DESCRIPTION OF THE INVENTION

The present invention is a process for forming improved condensation products of β-haloalkyl esters of pentavalent phosphorus acids which have flame retardant properties. A number of processes for formation of the class of compounds to be used in the present method are described in the patent literature and in various copending applications including the following:

1. U.S. Pat. No. 3,513,644 to Edward D. Weil which describes the preparation of polycondensed oligomeric phosphates by heating of tris(2-haloalkyl)phosphates.

2. U.S. Pat. Nos. 3,641,202 and 3,695,925 to Edward D. Weil which describe the preparation of oligomeric polycondensed phosphonates from bis(haloalkyl) vinyl phosphonates.

3. U.S. Pat. No. 3,896,187 of Edward D. Weil which describes liquid poly(haloethylethyleneoxy) phosphoric acid esters prepared by condensing tris(2-haloethyl) phosphate.

4. U.S. Ser. No. 410,583, filed Nov. 12, 1973, now abandoned, and U.S. Pat. No. 3,855,359, of Edward D. Weil which describe the copolycondensation of certain phosphates and phosphonates having a 2-haloalkyl group on at least one of these reactants.

5. U.S. Pat. No. 3,822,327 of Edward D. Weil which describes homo- and co-polycondensates of bis(2-haloethyl) vinylphosphonates.

6. U.S. Pat. No. 3,891,727 of Edward D. Weil which relates generally to condensation products of haloalkyl esters of pentavalent phosphorus acids.

These patents and pending applications insofar as they relate to the condensation products usable in the practice of the instant invention are incorporated herein by reference. The term "condensation product of a β-haloalkyl ester of a pentavalent phosphorus acid" as used herein includes condensation products produced either by self-condensation reactions of such esters or a condensation reaction of such a β-haloalkyl ester with other alkyl esters of pentavalent phosphorus acids.

The process of this invention is particularly applicable to the homocondensation product of tris(2-chloroethyl) phosphate, the copolycondensation product of bis(2-chloroethyl) vinyl phosphonate and dimethyl methylphosphonate, to the copolycondensation product of bis(2-chloroethyl) vinyl phosphonate and trimethyl phosphate, to the homopolycondensation product of bis(2-chloroethyl) vinylphosphonate, and to the copolycondensation product of tris (2-chloroethyl)-phosphate and dimethyl methylphosphonate.

Briefly, the polycondensation products are produced by reacting the monomer (both of which, as has already been noted, may be the same) to give off a volatile alkyl halide or alkylene dihalide and leave behind a non-volatile oligomeric condensation product.

The polycondensation reaction can be run without a catalyst, but, to permit lower temperatures and/or shorter reaction times, it is preferably conducted in the presence of a nucleophilic catalyst. Suitable quantities of catalyst are from a few parts per million, e.g., 50 p.p.m., up to about 10% by weight, preferably 0.01 – 5% based on weight of the reaction mixture.

The reaction mixture, with proper amount of catalyst, if desired, and in the desired molar ratio of starting materials, is heated to a temperature within the range of from about 110° to about 250°C., preferably 160°–190°C. Further details concerning the condensation reaction may be found in the disclosures previously incorporated herein by reference.

It has been suggested in U.S. Pat. No. 3,896,187 of Edward D. Weil in Canadian Patent No. 908,186, and in Belgian Patent No. 789,851, that residual acidity in the type of products of interest herein could be removed by treatment of those products with an alkylene oxide neutralizing agent until the free acidic groups in the products, i.e., the residual acid content, was present to an insignificant degree. Alternatively, it has been suggested in U.S. Pat. No. 3,891,727 of Edward D. Weil that treatment with an alcohol or with water and then with an epoxide be utilized rather than treatment with an epoxide. However, there was no suggestion in these prior art patents or pending applications of using an alkylene oxide treatment after neutralization of the residual acid content had been accomplished for an additional length of time to allow the alkylene oxide to act upon acidity liberated by labile groups contained in the condensed product, e.g., pyro, cyclic, and bridged groups, and thereby neutralize any further acidity which would occur by the opening of said groups. This invention is particularly directed to continuing the treatment with an alkylene oxide alone until labile groups have been opened and subsequently neutralized.

Any alkylene oxide can be used to act upon the labile groups contained in the product. "Alkylene oxide" is therefore broadly intended to include any compound having an oxirane group

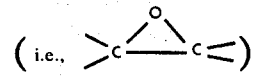

Illustrative of these compounds are ethylene oxide, propylene oxide, butylene oxide, styrene oxide, epichlorohydrin, epibromohydrin, diglycidyl ether, glycidyl butyl ether, glycidyl alkyl ether, glycidyl ether of phenol, diglycidyl ether of resorcinol, glycidyl ether of cresol and brominated cresol, glycidyl esters of acids such as acetic, acrylic and methacrylic acid, glycidol, diglycidyl ethers of bisphenol A and related epoxy resins made from bisphenol, or tetrahalobisphenols and epichlorohydrin, the diepoxide of dicyclopentylene ether, the diepoxide of vinylcyclohexene, the diepoxide of cyclohexenylmethyl cyclohexenecarboxylate, the diepoxide of bis(cyclohexenylmethyl) adipate, and the like. The alkylene oxide that is added after residual acidity has been neutralized in the product is used in an amount sufficient to act upon the labile groups contained therein, generally from about 1% to about 10% by weight based on the total of the product. When a gaseous epoxide, such as ethylene oxide, is employed, it may conveniently be passed in and through the reaction product until the labile groups have been treated. This will generally involve treating the product for about 2 hours to 12 hours, preferably from about 6–11 hours, after neutralization of residual acid content has taken place, e.g., by preliminary treatment with an alkylene oxide such as described above for 1 –4 hours. The unreacted excess which passes through can, if desired, be collected and recycled. The treatment with alkylene oxide is performed at a temperature of about 90°–140°C., preferably 90°–110°C.

The product formed by the process described herein when incorporated in a polyurethane foam formulation gives a foam having superior green strength to one containing the same product which has not been so treated. Poor green strength is demonstrated by a tacky top surface on the foam and/or a foam which tears easily after the initial cure.

The following working Examples illustrate the invention:

EXAMPLE 1

A condensed product of tris (2-chloroethyl) phosphate was formed by heating tris(2-chloroethyl) phosphate in the presence of 0.2% $Na_2CO_3$ at 180°C. Ethylene oxide was added at 92°–100°C for a period of about 4 hours at which time the acetone-water acid number (by methyl red) after 20 min. was about 0.5 mg KOH/g of product indicating neutralization of residual acidity. At this point, however, various labile groups existed, e.g., cyclic, pyro, and bridged groups which would generate further acidity when opened. The ethylene oxide treatment was continued for an additional 4 hours to react with labile species and give an acid number of 0.48 mg KOH/g in acetone-water after 20 minutes.

EXAMPLE 2

A product similar to that formed in Example 1 was treated with ethylene oxide at 93°–100°C. for four hours to neutralize residual acidity (acid number = 0.30 mg KOH/g) and for an additional 5½ hours to reduce the acid number in acetone-water after 20 min. to 0.05 mg KOH/g.

EXAMPLE 3

A product similar to those in Examples 1 and 2 was treated at 93°–101°C. with ethylene oxide for four hours to give an acid number of 0.8 mg KOH/g and for 3.5 additional hours to give an acid number of 0.09 mg KOH/g in acetone-water (methyl red).

EXAMPLE 4

A product similar to Example 1–3 was treated for 3.5 hours at 94°–103°C. with ethylene oxide giving an acid number of 0.8 mg KOH/g. An additional 4 hours gave an acid number of 0.05.

EXAMPLES 5–6

A series of ethylene oxide treatments were attempted wherein the period of ethylene oxide treatment was maintained only for a period to neutralize residual acidity. The treatment temperature was from about 95°–110°C.

| Sample | Treatment Time To Neutralize (hrs) |
|---|---|
| 5 | 2.5 |
| 6 | 2.2 |

EXAMPLE 7

The products from Examples 1–6 above were incorporated in a polyurethane foam formulation at 10 parts by weight. The other ingredients were:

| Reagents | Parts by Weight |
|---|---|
| Niax 16-46 Polyol (Union Carbide) | 100 |
| $H_2O$ | 4 |
| Niax A-1 Catalyst | 0.1 |
| N-ethyl morpholine | 0.2 |
| L-548 Silicone | 1.0 |
| T-10 Stannous Octoate (50% in dioctyl phthalate) | 0.4 |
| Toluene Diisocyanate (80%-2,4 isomer; 20%-2,6 isomer) | 50.5 |

The foam was cured for 10 minutes at 125°C and was examined for its physical properties. The Table below sets forth the green strength of the foam. Green strength is a measure of the proper gelation and handling characteristics. Poor green strength is demonstrated by a tacky top surface on the foam and/or a foam structure which tears easily after the initial cure. Condensed products that are not treated in accordance with the present invention, e.g., Samples 5 and 6, demonstrate such inferior physical properties.

| Sample from Example | Total EO Treatment (Hrs) | Green Strength |
|---|---|---|
| 1 | 8 | Good |
| 2 | 9 | Good |
| 3 | 7.5 | Good |
| 4 | 7.5 | Good |
| 5 | 2.5 | Poor |
| 6 | 2 | Poor |

EXAMPLE 8

Tris(2-chloroethyl) phosphate was heated at 165°C to form a condensed product by the process set forth in Example 1. This product was treated with ethylene oxide at 100°C for varying amounts of time. Various samples were used in formulating a polyurethane foam as described in Example 7. The Table set forth below gives the results:

| Sample's Time of Treatment (hrs) | Acid No. In Water-Acetone at 24 hrs. (mg KOH/g) | Green Strength |
|---|---|---|
| 3 | 9.5 | Poor |
| 6 | 9 | Poor |
| 8 | 8.7 | Poor |
| 15 | 3.8 | Good |
| 24 | 6.4 | Fair |

In addition to the particular condensation products described above, this definition also includes the type of condensation products described in U.S. Pat. No. 3,764,640 to Klose.

What is claimed:

1. A process for forming a stabilized condensation product, which is adapted to be incorporated in a polyurethane foam, derived from condensing a β-haloalkyl ester of a pentavalent phosphorus acid with itself or with an alkyl ester of a pentavalent phosphorus acid to form a condensation product which comprises treating said condensation product with from about 1% to about 10%, by weight based on the weight of the condensation product of an alkylene oxide for from about 2 to about 12 hours at a temperature of about 90°C. to about 140°C. after residual acidity has been neutralized to open labile groups contained in the product and to neutralize those groups.

2. A process as claimed in claim 1 wherein the alkylene oxide is added for a period of about 6–11 hours after the residual acidity has been neutralized.

3. A process as claimed in claim 1 wherein the alkylene oxide is added at a temperature of about 90°–110°C.

4. A process as claimed in claim 1 wherein the alkylene oxide which is added is ethylene oxide.

5. A process as claimed in claim 1 wherein the condensation product which is treated is selected from the group consisting of the homocondensation product of tris(2-chloroethyl) phosphate, the copolycondensation product of bis(2-chloroethyl) vinylphosphonate and dimethyl methylphosphonate, the copolycondensation product of bis(2-chloroethyl) vinylphosphonate and trimethyl phosphate, the homocondensation product of bis(2-chloroethyl) vinylphosphonate, and the copolycondensation product of tris(2-chloroethyl) phosphate and dimethyl methylphosphonate.

6. The stabilized products formed by the process of claim 1.

7. A stabilized product formed by the process of claim 5.

* * * * *